United States Patent
Pfisterer

(10) Patent No.: US 10,823,282 B2
(45) Date of Patent: Nov. 3, 2020

(54) METHOD AND DEVICE FOR IMPROVING THE GEAR-CHANGING QUALITY OF A MOTOR VEHICLE HAVING AN AUTOMATIC TRANSMISSION

(71) Applicant: Bayerische Motoren Werke Aktiengesellschaft, Munich (DE)

(72) Inventor: Markus Pfisterer, Puchheim (DE)

(73) Assignee: Bayerische Motored Werke Aktiengesellschaft, Munich (DE)

( * ) Notice: Subject to any disclaimer, the term of this patent is extended or adjusted under 35 U.S.C. 154(b) by 78 days.

(21) Appl. No.: 16/288,382

(22) Filed: Feb. 28, 2019

(65) Prior Publication Data

US 2019/0257416 A1 Aug. 22, 2019

Related U.S. Application Data

(63) Continuation of application No. PCT/EP2017/071904, filed on Aug. 31, 2017.

(30) Foreign Application Priority Data

Sep. 19, 2016 (DE) .................. 10 2016 217 865

(51) Int. Cl.
*F16H 61/06* (2006.01)
*F16H 61/684* (2006.01)
*F16H 61/00* (2006.01)

(52) U.S. Cl.
CPC ......... *F16H 61/061* (2013.01); *F16H 61/684* (2013.01); *F16H 2061/0087* (2013.01); *F16H 2061/062* (2013.01)

(58) Field of Classification Search
CPC ............. F16H 61/061; F16H 2061/062; F16H 2061/0087
See application file for complete search history.

(56) References Cited

U.S. PATENT DOCUMENTS 7,909,733 B2 * 3/2011 Imediegwu ......... F15B 13/0433
477/143
8,303,463 B2 * 11/2012 Sah .................. F16D 48/02
477/5

(Continued)

FOREIGN PATENT DOCUMENTS

CN 102612611 A 7/2012
CN 102639895 A 8/2012

(Continued)

OTHER PUBLICATIONS

International Search Report (PCT/ISA/210) issued in PCT Application No. PCT/EP2017/071904 dated Oct. 17, 2017 with English translation (five pages).

(Continued)

*Primary Examiner* — David R Morris
(74) *Attorney, Agent, or Firm* — Crowell & Moring LLP

(57) ABSTRACT

Gear-changing quality of a motor vehicle having an automatic transmission in which filling pressure adaptation processes are carried out by an electronic control device by predefined activation of an oil pump and selected hydraulic switching elements is improved by inclusion of a minimum time margin between the individual adaptation processes predefined by the control device such that parallel adaptation processes are prevented.

8 Claims, 2 Drawing Sheets

(56) References Cited

U.S. PATENT DOCUMENTS

| | | | | |
|---|---|---|---|---|
| 8,510,006 B2* | 8/2013 | Bader | ............... | F16D 48/066 |
| | | | | 701/68 |
| 8,726,751 B2* | 5/2014 | Martin | ............... | F16D 48/066 |
| | | | | 74/335 |
| 9,097,337 B2* | 8/2015 | Sah | ............... | F16H 61/0031 |
| 9,140,337 B2* | 9/2015 | Sah | ............... | B60W 10/06 |
| 9,651,148 B2* | 5/2017 | Hess | ............... | F16H 61/18 |
| 2008/0060717 A1* | 3/2008 | Dourra | ............... | F16H 61/061 |
| | | | | 141/95 |
| 2009/0105039 A1* | 4/2009 | Sah | ............... | F16H 61/061 |
| | | | | 477/5 |
| 2009/0111643 A1* | 4/2009 | Sah | ............... | F16D 48/066 |
| | | | | 477/5 |
| 2009/0112421 A1* | 4/2009 | Sah | ............... | F16H 61/0021 |
| | | | | 701/59 |
| 2012/0247611 A1 | 10/2012 | Martin et al. | | |
| 2012/0247910 A1 | 10/2012 | Bader et al. | | |
| 2015/0211630 A1 | 7/2015 | Hess et al. | | |

FOREIGN PATENT DOCUMENTS

| | | |
|---|---|---|
| DE | 102 48 179 A1 | 4/2004 |
| DE | 10 2008 000 015 A1 | 7/2009 |
| DE | 10 2014 201 603 A1 | 7/2015 |
| WO | WO 2011/076509 A1 | 6/2011 |

OTHER PUBLICATIONS

German-language Search Report issued in German Application No. 10 2016 217 865.2 dated Jun. 19, 2020 with partial English translation (10 pages).

Lackner S., "Adaptionen in automatisierten Getrieben", Institut fuer Maschinenelemente und Entwicklungsmethodik, Technische Unversitaet Graz; Aug. 2, 2012, pp. 1-119 (126 pages).

Chinese-language Office Action issued in counterpart Chinese Application No. 201780053971.4 dated Feb. 6, 2020 with English translation (13 pages).

* cited by examiner

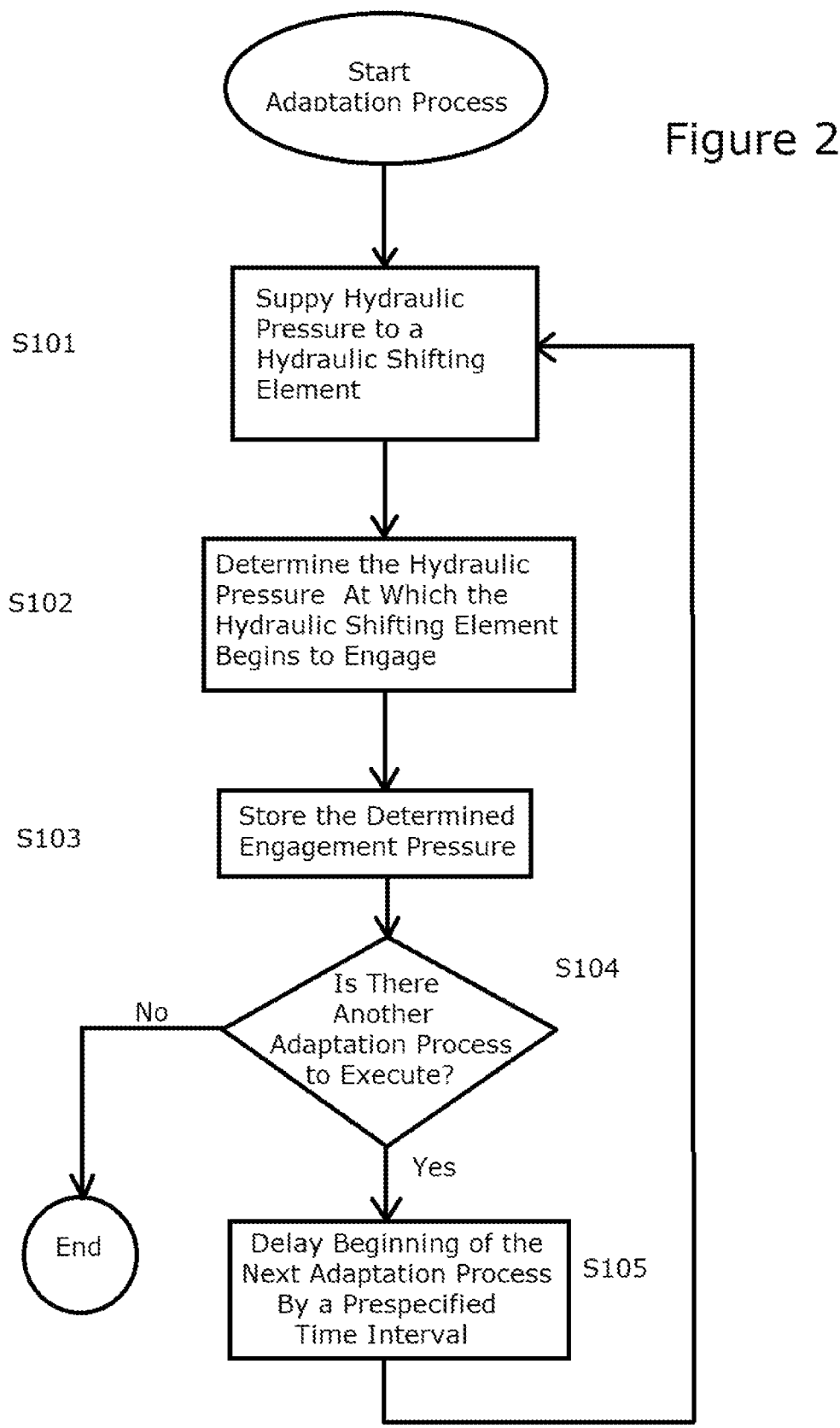

METHOD AND DEVICE FOR IMPROVING THE GEAR-CHANGING QUALITY OF A MOTOR VEHICLE HAVING AN AUTOMATIC TRANSMISSION

CROSS REFERENCE TO RELATED APPLICATIONS

This application is a continuation of PCT International Application No. PCT/EP2017/071904, filed Aug. 31, 2017, which claims priority under 35 U.S.C. § 119 from German Patent Application No. 10 2016 217 865.2, filed Sep. 19, 2016, the entire disclosures of which are herein expressly incorporated by reference.

BACKGROUND AND SUMMARY OF THE INVENTION

The invention relates to a method and to a device for improving the shift quality of a motor vehicle having an automatic transmission.

DE 10 2008 000 015 A1 discloses, for example, a method for improving the shift quality of a motor vehicle having an automatic transmission, which method already provides filling pressure adaptation processes, in particular for hydraulic shifting elements (for example clutches) which have just been disengaged. It is already identified here that adaptation processes of this kind are time-consuming.

The invention is based on the object of optimizing filling pressure adaptation processes in respect of the total service life of a motor vehicle.

In order to improve the shift quality of a motor vehicle having an automatic transmission, in which filling pressure adaptation processes are carried out by an electronic controller by prespecified actuation of an oil pump and selected hydraulic shifting elements, according to the invention a minimum time interval is prespecified between selected or all individual adaptation processes by the controller, wherein parallel adaptation processes are prevented.

The order of the adaptation processes when prespecifying the minimum time interval is preferably prespecified independently of the association to a shifting element.

The minimum time interval is preferably prespecified by a defined total distance traveled or by a defined total travel time minus the deactivation time.

In one development of the invention, the adaptation processes are carried out only when the vehicle is stationary, wherein precisely one drive motor which is present is operated at a prespecified constant rotation speed and/or at a prespecified constant torque, and the adaptation processes are carried out up until a first change in the rotation speed and/or in the torque which corresponds to the current in the case of an electric motor drive.

In a further advantageous refinement of the invention, the adaptation processes are carried out only when the vehicle is stationary, wherein
- automatic engine stoppage is suppressed in the case of an internal combustion engine drive being present, or
- the internal combustion engine drive is switched off and only the electric motor drive is operated in the case of an internal combustion engine drive being present and in the case of an electric motor drive being present.

The invention also comprises a device for improving the shift quality of a motor vehicle having an automatic transmission, comprising an oil pump and comprising an electronic controller which is designed in such a way that filling pressure adaptation processes can be carried out by prespecified actuation of the oil pump and selected hydraulic shifting elements, wherein a minimum time interval can be prespecified between individual adaptation processes for carrying out the filling pressure adaptation processes and parallel adaptation processes can be prevented.

The invention is based on the following considerations:

In order to firstly compensate for manufacturing tolerances for the purpose of increasing the shifting convenience, automatic transmissions are adapted in respect of an optimum filling pressure in the shifting elements in the first kilometers as soon as possible after completion. The wear is later corrected by repeating the adaptation processes (filling pressure adaptation operations). An adaptation process and the repetition of said adaptation process are dependent on the connection of the respective shifting element. The adaptation processes are preferably carried out only on shifting elements which have just been switched off. In this case, the adaptation processes are preferably also performed in a temperature-dependent manner owing to the viscosity of the oil. Depending on the shifting element (for example start-up clutch or electric oil pump), two or even several temperature ranges are necessary. Particularly in the case of hybrid vehicles or similar drive configurations, consumption or range influences can occur when adaptation processes are intended to be carried out when the vehicle is stationary (called adaptations when stationary in the following text), in which adaptation processes, for example, switching off of the internal combustion engine has to be prevented or the electric motor has to be turned.

In this case, the distribution of the frequency of known adaptation processes of this kind cannot be predicted. An accumulation of several adaptation processes quickly leads to adverse effects on consumption and losses in range. A great accumulation occurs specifically in the new state because the transmission has not yet carried out any adaptation processes.

Owing to immediately successive adaptation processes, in particular for hydraulic shifting elements which have just been disengaged, being blocked according to the invention, a defined distribution of the adaptations when stationary should already be achieved, beginning with a new start, over the total run time independently of the status and independently of the requirement of the vehicle, in particular of the transmission.

Other objects, advantages and novel features of the present invention will become apparent from the following detailed description of one or more preferred embodiments when considered in conjunction with the accompanying drawing.

BRIEF DESCRIPTION OF THE DRAWING

FIG. 2 shows a flow chart of a method in accordance with an embodiment of the present invention.

DETAILED DESCRIPTION OF THE DRAWING

Figure 1:
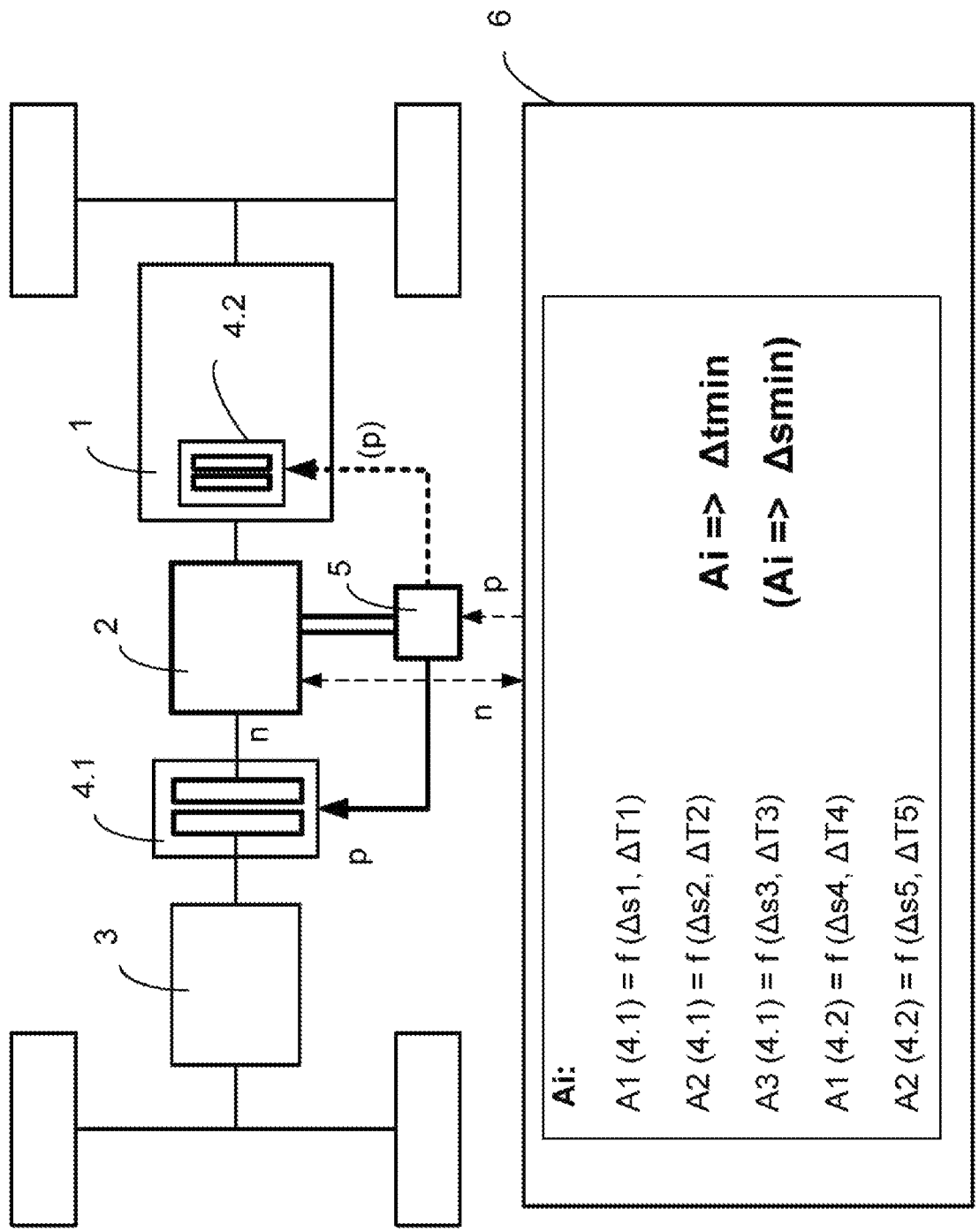
FIG. 1 shows a schematic illustration of an overview of the device and method components of the invention.

The drawing schematically illustrates a hybrid vehicle having an automatic transmission 1, an electric motor (electric motor drive) 2 and an internal combustion engine (internal combustion engine drive) 3. A drive clutch 4.1 is located between the electric motor 2 and the internal combustion engine 3 as a first example of a shifting element to be adapted. A start-up clutch 4.2 is also located in the automatic transmission 1 as a second shifting element to be adapted. A third example (not illustrated here) of a shifting element to be adapted may also be an electric oil pump for filling the clutches. An electronic controller 6 controls a hydraulic oil pump 5 in a prespecified manner for the purpose of carrying out filling pressure adaptation processes, which are known per se, by applying filling pressure to the shifting elements 4.1 and 4.2. Particularly in the case of clutches as shifting elements, the correct filling pressure for achieving beginning of closing (so-called "touchpoint") should be ascertained by the adaptation processes. Here, a plurality of iterative adaptation processes are often required even only for one shifting element.

In the controller 6, a functional module according to the invention defines basic adaptation processes Ai for each shifting element to be adapted, here 4.1 and 4.2, preferably for different temperature ranges $\Delta T$ and/or for specific distances traveled $\Delta S$, here for example:

A1 (4.1)=f($\Delta$s1, $\Delta$T1)
A2 (4.1)=f($\Delta$s2, $\Delta$T2)
A3 (4.1)=f($\Delta$s3, $\Delta$T3)
A1 (4.2)=f($\Delta$s4, $\Delta$T4)
A2 (4.2)=f($\Delta$s5, $\Delta$T5)

According to the invention, the controller 6 is designed, for example by a correspondingly programmed functional module, in such a way that a minimum time interval ($\Delta$tmin or $\Delta$smin) is prespecified between the individual adaptation processes Ai for carrying out the individual filling pressure adaptation processes Ai and parallel adaptation processes Ai are prevented. The minimum time interval is preferably prespecified by a defined total distance traveled $\Delta$smin or by a defined total travel time $\Delta$tmin minus the deactivation time. FIG. 2 shows an embodiment of the method of the present invention in which after the start of the adaptation process, hydraulic pressure is applied to a hydraulic shifting element (step S101). The controller then determines the hydraulic pressure at which the hydraulic shifting element begins to engage (step S102) and this engagement pressure is stored for later use (step S103). The controller then determines whether there is another adaptation process to be executed (step S104). If no, the processing terminates. If yes, the next adaptation process is delayed by a prespecified interval (step S105), followed by return to the beginning (step S101).

The order of the adaptation processes Ai when prespecifying the minimum time interval $\Delta$tmin or $\Delta$smin is prespecified independently of the association to a shifting element 4.1 or 4.2. Therefore, for example, A1 (4.2) could follow A2 (4.1) and then A3 (4.1) could follow A1 (4.2) with a time interval, if necessary.

These adaptation processes Ai are preferably carried out only when the vehicle is stationary, wherein precisely one drive motor 2 or 3 which is present, for example the electric motor 2, is operated at a prespecified constant rotation speed n or with a prespecified constant current (corresponds to torque in the case of the electric motor 2), and the adaptation processes Ai are carried out up until a first change in the rotation speed n or in the current (or the torque) when pressure p is applied to a shifting element 4.1 or 4.2.

In this case, automatic engine stoppage is preferably suppressed in the case of an internal combustion engine drive 3 being present, or the internal combustion engine drive 3 is switched off and only the electric motor drive 2 is operated in the case of an internal combustion engine drive 3 being present and in the case of an electric motor drive 2 being present.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for improving a shift quality of a motor vehicle having an automatic transmission in which filling pressure adaptation processes are carried out by an electronic controller, comprising the acts of:
   in a first adaptation process, actuating with the controller an oil pump to supply hydraulic pressure to a hydraulic shifting element of a plurality of hydraulic shifting elements; and
   determining with the controller a hydraulic pressure applied to the hydraulic shifting element by the oil pump at which the hydraulic shifting element begins to engage,
   wherein a minimum time interval is prespecified between an end of the first adaptation process and a beginning of another adaptation process with another one of the hydraulic shifting elements, the prespecified minimum time interval being long enough to prevent parallel execution of adaptation processes and
   the minimum time interval is prespecified by
      a defined total distance traveled by the hydraulic shifting element after the start of the application of the hydraulic pressure, or
      a defined total travel time of the hydraulic shifting element after the start of the application of the hydraulic pressure minus a deactivation time of the hydraulic shifting element.

2. The method as claimed in claim 1, wherein
   an order of the adaptation processes is prespecified independently of an association to specific ones of the hydraulic shifting elements.

3. The method as claimed in claim 1, wherein
   the adaptation processes are carried out by the controller only when the vehicle is stationary,
   the motor vehicle includes at least one motor, and
   precisely one motor of the at least one motor is operated at one or more of a prespecified constant rotation speed and a constant torque, and
   the first adaptation process is carried out up until a first change in the one or more of the prespecified constant rotation speed and the constant torque.

4. The method as claimed in claim 3, wherein
   the adaptation processes are carried out only when the vehicle is stationary, and
   when the at least one motor includes an internal combustion engine, automatic engine stoppage is suppressed.

5. The method as claimed in claim 3, wherein
   the adaptation processes are carried out only when the vehicle is stationary, and
   when the at least one motor includes an internal combustion engine motor and an electric motor, the internal combustion engine drive is switched off when the electric motor is the precisely one drive motor.

6. A device for improving a shift quality of a motor vehicle having an automatic transmission, comprising:
   an oil pump; and
   an electronic controller,
   wherein
      the electronic controller is configured to control the oil pump to execute filling pressure adaptation processes by prespecified actuation of the oil pump to apply hydraulic pressure to different ones of a plurality of hydraulic shifting elements, the electronic controller is configured to control oil pump with a prespecified minimum time interval between an end of a first adaptation process with a first one of the plurality of hydraulic shifting elements and a beginning of another adaptation process with another one of the plurality of hydraulic shifting elements, the prespecified minimum time interval being long enough to prevent parallel execution of adaptation processes, and the prespecified minimum time interval is
- a defined total distance traveled by the hydraulic shifting element after the start of the application of the hydraulic pressure, or
- a defined total travel time of the hydraulic shifting element after the start of the application of the hydraulic pressure minus a deactivation time of the hydraulic shifting element.

7. An electronic control unit configured to execute a method for improving a shift quality of a motor vehicle having an automatic transmission in which filling pressure adaptation processes are carried out by the electronic control unit, the electronic control unit being configured to:

in a first adaptation process actuate an oil pump to supply hydraulic pressure to a hydraulic shifting element of a plurality of hydraulic shifting elements; and determine a hydraulic pressure applied to the hydraulic shifting element by the oil pump at which the hydraulic shifting element begins to engage, wherein
a minimum time interval is prespecified between an end of the first adaptation process and a beginning of another adaptation process with another one of the plurality of hydraulic shifting elements, the prespecified minimum time interval being long enough to prevent parallel execution of adaptation processes, and the prespecified minimum time interval is
- a defined total distance traveled by the hydraulic shifting element after the start of the application of the hydraulic pressure, or
- a defined total travel time of the hydraulic shifting element after the start of the application of the hydraulic pressure minus a deactivation time of the hydraulic shifting element.

8. A motor vehicle, comprising:
an automatic transmission;
one or more of an internal combustion engine drive and an electric motor drive; and
at least one electronic controller configured to execute a method for improving a shift quality of a motor vehicle in which filling pressure adaptation processes are carried out by the electronic controller, electronic controller being configured to:

in a first adaptation process actuate an oil pump of the automatic transmission to supply hydraulic pressure to a hydraulic shifting element of a plurality of hydraulic shifting elements; and determine a hydraulic pressure applied to the hydraulic shifting element by the oil pump at which the hydraulic shifting element begins to engage, wherein
a minimum time interval is prespecified between an end of the first adaptation process and a beginning of another adaptation process with another one of the plurality of hydraulic shifting elements, the prespecified minimum time interval being long enough to prevent parallel execution of adaptation processes, and the prespecified minimum time interval is
- a defined total distance traveled by the hydraulic shifting element after the start of the application of the hydraulic pressure, or
- a defined total travel time of the hydraulic shifting element after the start of the application of the hydraulic pressure minus a deactivation time of the hydraulic shifting element.

\* \* \* \* \*